Oct. 14, 1924.
H. P. YATES
VESSEL
Filed May 4, 1923
1,511,435
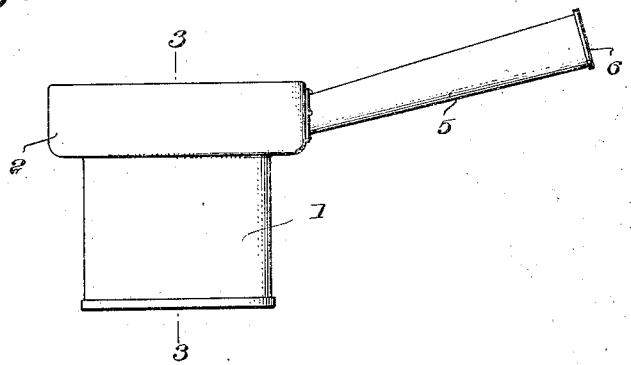
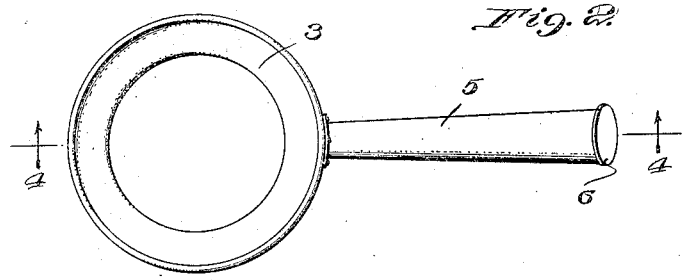
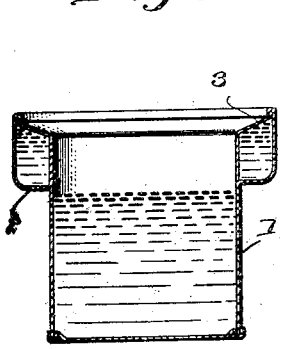
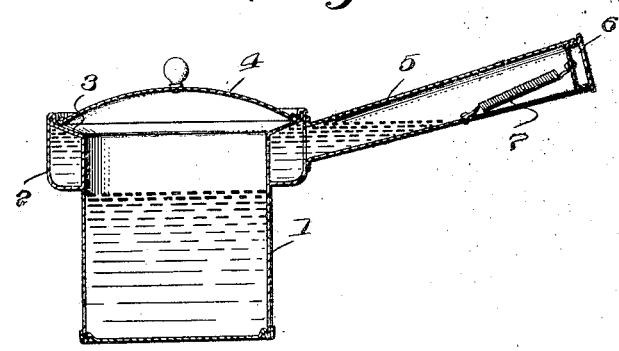
Henry P. Yates
INVENTOR
BY Victor J. Evans
ATTORNEY Patented Oct. 14, 1924.

1,511,435

UNITED STATES PATENT OFFICE.

HENRY P. YATES, OF NEW ORLEANS, LOUISIANA.

VESSEL.

Application filed May 4, 1923. Serial No. 636,720.

*To all whom it may concern:*

Be it known that I, HENRY P. YATES, a citizen of the United States, residing at New Orleans, in the parish of Orleans and State of Louisiana, have invented new and useful Improvements in Vessels, of which the following is a specification.

This invention relates to a cooking utensil in the nature of a boiling pot, and has for its primary object to provide a utensil with an upper exteriorly arranged water chamber for retaining the top of the utensil in practically a cooled condition and for preventing the boiling over of substances cooked in the pot.

A further object is to provide a cooking utensil such as a pot with an exteriorly arranged circumferentially disposed water chamber at the mouth thereof and to further provide a hollow handle that communicates with the chamber and which provides a water inlet thereto, whereby the comparatively cool water in the chamber will prevent the boiling over of the contents of the pot and also whereby the handle will be retained in a practically cooled condition so that the utensil can be readily handled without injury to the cook.

With these and other objects in view this invention will be better understood from the following detailed description taken in connection with the accompanying drawing wherein:—

Figure 1 is a side elevation of a cooking utensil in accordance with this invention.

Figure 2 is a top plan view thereof.

Figure 3 is a sectional view on the line 3—3 of Figure 1.

Figure 4 is a sectional view on the line 4—4 of Figure 2, the cover for the vessel being in place.

Again referring to the drawing, the numeral 1 designates an ordinary cooking utensil in the nature of a boiling pot. The pot has arranged around the mouth thereof an outwardly projected chamber 2. The outer wall of the chamber projects a suitable distance above the top wall 3 of the said chamber so that the lid or cover 4 resting upon the top wall will be in the path of contact with the outer wall of the said chamber and thus effectively retained on the utensil.

The chamber 3 has an opening in the upper wall thereof closed by an upwardly inclined hollow handle 5. The open end of the handle is closed by a flanged cap 6 urged by a spring 7 to closed position.

In operation, the cap is moved outwardly from the handle against the pressure of the spring 8, and cool water is poured through the handle to enter and fill the chamber and likewise partly fill the handle. The cap is released so that the spring will move the same to handle closing position. Milk or other liquids arranged in the pot for cooking, and upon reaching the boiling point, will rise to the top of the pot, and being brought into contact with the portion thereof opposite the chamber, which latter is retained in practically a cooled condition by the water in the chamber, will be prevented from boiling over the pot. In a like manner, the water in the chamber and handle retains the latter in a practically cooled condition so that the utensil can be conveniently handled by the cook.

Having described the invention, I claim:—

A cooking utensil having an exteriorly arranged cold water chamber surrounding the mouth thereof, the top wall of said cold water chamber inclining upwardly and outwardly, said cold water chamber having its outer wall extending above said top wall, a cover for the utensil adapted to rest on said top wall, an upwardly inclined hollow handle connected to and communicating with the chamber, said handle having its outer end disposed above the top of said chamber, and a spring urged closure member for said handle.

In testimony whereof I affix my signature.

HENRY P. YATES.